United States Patent
Price

[11] 3,913,607
[45] Oct. 21, 1975

[54] OXYGEN DILUTION APPARATUS
[75] Inventor: John H. Price, LaJolla, Calif.
[73] Assignee: Hudson Oxygen Therapy Sales Company, Temecula, Calif.
[22] Filed: May 7, 1974
[21] Appl. No.: 467,750

[52] U.S. Cl. ............ 137/271; 128/210; 137/556.6; 137/604; 417/178; 417/198; 431/13; 431/114; 431/156
[51] Int. Cl.² ......................................... F16K 19/00
[58] Field of Search ....... 48/180 C, 180 P; 128/209, 128/210; 137/271, 556.6, 604, 556.3; 417/178, 196, 198; 431/13, 17, 114, 156, 354, 355

[56] References Cited
UNITED STATES PATENTS

| | | | |
|---|---|---|---|
| 2,585,835 | 2/1952 | Preiss | 48/180 C |
| 2,758,553 | 8/1956 | Moser | 137/604 |
| 3,128,994 | 4/1964 | Hungate | 137/604 X |
| 3,818,937 | 6/1974 | LaGanke | 137/604 |

*Primary Examiner*—Robert G. Nilson
*Attorney, Agent, or Firm*—Jerry R. Seiler

[57] ABSTRACT

An oxygen dilution apparatus for regulating the concentration of oxygen directed therefrom comprises a hollow cylindrical member open at both ends one end of which has at least one slot extending from one cylinder end, an air dilution cap having an end wall and a cylindrical side wall defining a chamber and at least one port on the side wall and which cap rotatably engages the slotted end of the cylindrical member, and an oxygen supply pipe for directing oxygen into the chamber extending through the cap end wall and terminating in a notched end having a restricted orifice whereby the cap is rotatably adjustable on the cylinder member to provide selective communication of the slot with the port to adjust the amount of entrained air passing therethrough to the chamber for varying the oxygen concentrations.

In another embodiment, two oxygen dilution caps are provided with a single cylinder for selective use to achieve high or low concentrations.

8 Claims, 8 Drawing Figures

OXYGEN DILUTION APPARATUS

BACKGROUND OF THE INVENTION

Oxygen diluter devices for delivering oxygen to patients requiring inhalation therapy, usually in combination with oxygen masks of various types, are well known in the art. Such devices incorporate various techniques for allowing the therapist or physician to regulate the oxygen concentrations. These prior art devices normally incorporate a nozzle secured to an oxygen supply tube the nozzle having a small aperture at one end within a dilution chamber with ports for entraining air into the chamber thereby achieving the desired oxygen dilution. As a high but concentrated flow of oxygen passes from the nozzle into the enlarged chamber, a partial vacuum is created in the vicinity of the oxygen stream thereby entraining outside air through the ports.

Most prior art oxygen diluter devices are constructed to provide only a single oxygen dilution or concentration at a specified oxygen flow rate. However, for different patients, or for weaning some patients from higher oxygen to lower concentrations and finally to comfortably breathe air, different concentrations are desired. Heretofore, separate diluter units were required each offering a specific oxygen concentration or dilution thereby necessitating the use of a number of such diluters. Such a limitation thus requires the purchase, storage and handling of multiple diluters. Another problem with prior art diluters involves excessive noise levels, especially at higher flow rates, for example, above about 6 liters per minute. The excessive noise is normally caused by the oxygen forced through the small aperture in the dilution chamber. Such a noise can be most annoying to the patient using the device as well as to others in the room. It is to the elimination of such problems and disadvantages that the present invention is directed.

SUMMARY OF THE INVENTION

The diluter apparatus of the invention eliminates the disadvantages of requiring a separate diluter to achieve different oxygen concentrations. The device is relatively simple, easy to manufacture and assemble and can be molded in only two parts thereby achieving significant cost and assembly advantages. Moreover, because of its unique structure, the apparatus of the invention can be used to achieve not only usually preferred oxygen concentrations of 24, 28, 35 and 40%, but can be adjusted to achieve any number of concentrations between. Further, because of a unique construction of the nozzle orifice reduced noise is achieved.

The device of the invention incorporates a hollow cylindrical member open at both ends, one end of which is designed to receive an air dilution cap and the other which is attached directly to an oxygen mask or large bore tubing for such a mask, and an air dilution cap having at least one port along its side wall and which is rotatably adjustable on the cylindrical member. The cylindrical member incorporates at least one slot at or adjacent one end so that when the dilution cap is rotatably adjusted, the port will become aligned with the slot which gradually opens the chamber defined within the air dilution cap and concentric cylinder member. In other words, as the air dilution cap is rotated a chamber within the air dilution cap and lower end of the concentric hollow cylinder is opened or closed to varying extents which allows for "tuning" the size of the port and concomitantly achieves varying oxygen dilutions. The air dilution cap also incorporates an oxygen supply pipe which extends through an end wall of the cap and into the chamber defined within the cap. A special advantage of the invention is that because of the construction of the end of the pipe which extends into the chamber, noise levels are significantly reduced and which features and advantages will be described in the following detailed description.

In a second embodiment two oxygen dilution caps are provided, one for achieving lower concentrations and the other for higher concentrations. The cylindrical member and caps also incorporate means for preventing the wrong cap from being secured for a desired range of oxygen concentrations.

DETAILED DESCRIPTION OF THE INVENTION

Figure 1:
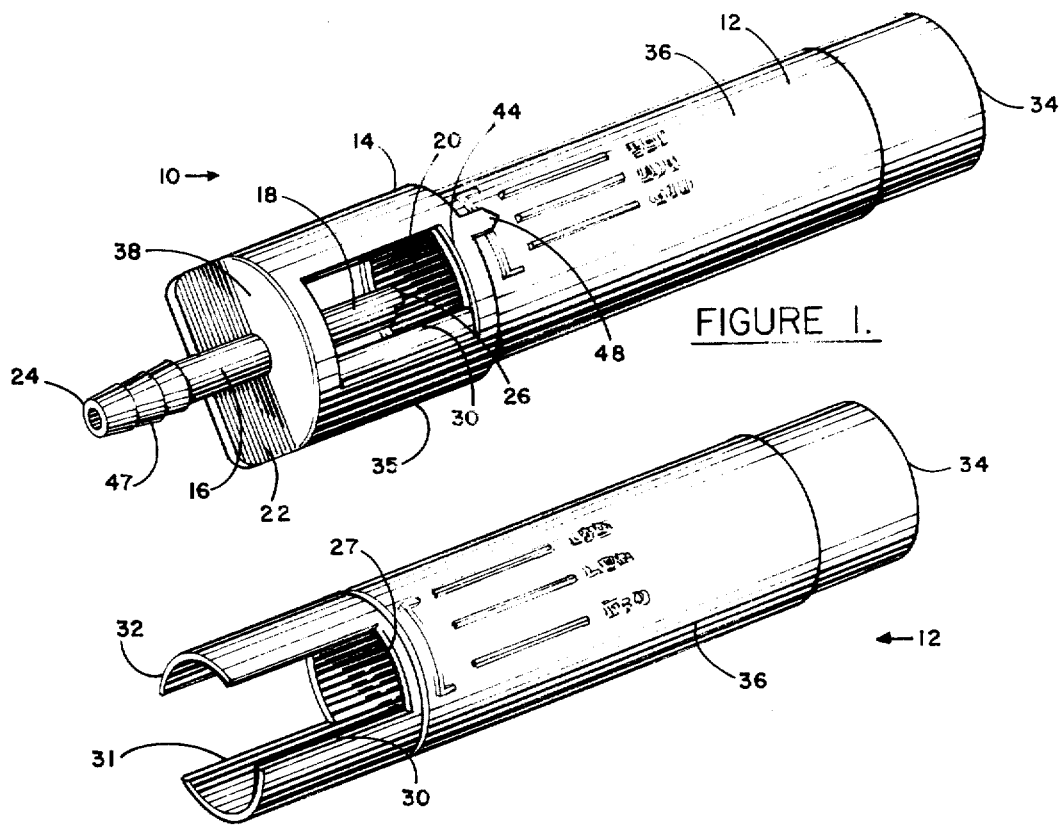
FIG. 1 is a perspective side view of the assembled apparatus of the invention.
Figure 2:
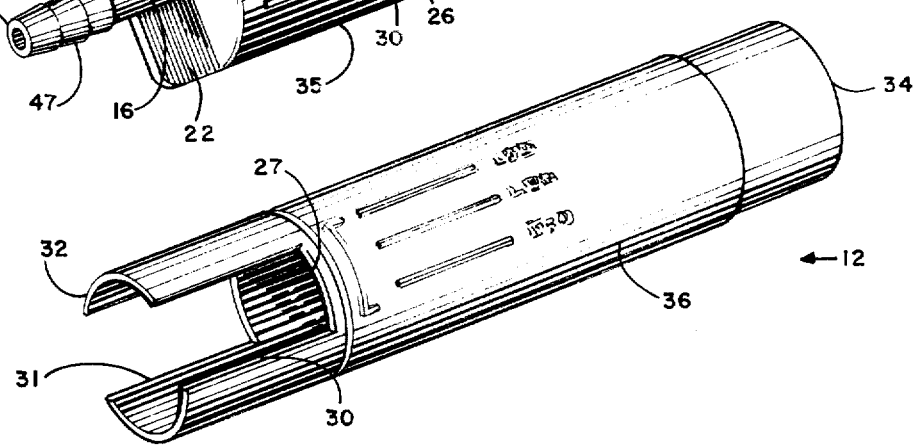
FIG. 2 is a perspective side view of the hollow cylindrical member.

Referring initially to FIG. 1, the diluter apparatus 10 comprises a hollow cylindrical member 12 and an air diluter cap 14 in which the end of the cylindrical member is received. Referring also to FIG. 2, cylindrical member 12 is hollow and has a forward end 12 and rearward end 34, both of which are open. Adjacent the forward end is an enlarged slot 30, the device shown including a second such slot 31 both extending from the forward end 32 along a portion of the cylinder length. The exterior wall 36 of cylindrical member 12 is circular and preferably is uniform in dimensions along its length although variations may be desired. However, the forward end 32 and the length of member 12 which is received in diluter cap 14 is uniform or at least of such a shape so that when received in the cap, the latter can be rotatably adjusted.

Figure 3:
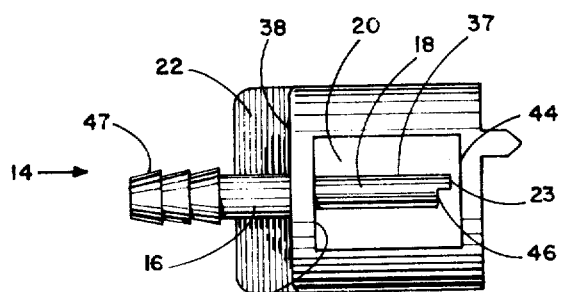
FIG. 3 is a side view of the air dilution cap and oxygen supply pipe.

Observing also FIG. 3, air diluter cap 14 incorporates an annular side wall 35 extending from an end wall 38 whereby there is defined within the side wall an air dilution chamber and in which end 32 of cylindrical member 12 is received. Preferably, and in the embodiment shown, the diameter or dimensions across the end 32 of cylindrical member 12 will be such that the exterior surface of the end portion received in the dilution cavity will allow it to slightly frictionally engage the interior surface of annular side wall 35. In that manner, cap 14 can be readily and easily rotated by an operator but the fit will not be so loose as to allow the dilution cap to easily fall off or be accidently removed from the hollow cylindrical member. The dilution cap may also have a flange and the cylindrical member a notch for receiving the flange for preventing accidental removal.

It will be noted that slot 30 in cylindrical member 12 has an inner terminating edge 27 which is preferably disposed along the length of the cylindrical body 36 such that when end 32 is fully received within the air dilution cap with the lower edge of cylinder 12 abutting the interior surface of cap end wall 38, inner edge 27 will be closely adjacent port edge 23 of cap 14 (note FIGS. 1 and 3). In other words, the length of port 20 and the length of slot 30 of the cylindrical member will be such that their respective inner terminal edges will be substantially aligned or flush with one another or nearly so. Although such a feature is not critical, it does provide for the maximum opening when the air dilution cap has been rotated to open the port communicating with the cap interior.

Again, observing FIG. 3, air dilution cap 14 includes oxygen supply pipe 18 having an exterior pipe portion 16 extending exteriorly of the dilution cap and through cap end wall 38. Portion 16 also preferably incorporates frustoconical segments 47 for better securing small bore oxygen supply tubing. An interior pipe portion 37 extends into chamber 20 within the cap, it being understood that the pipe portions 16 and 37 are conveniently molded as a single pipe integral with the remainder of the cap 14. However, it should also be appreciated that if desired, the pipe may be formed separately and inserted into the cap end wall 38 utilizing threaded engagement means, detent locking means and the like. However, for simplicity, ease of manufacture and assembly, an integrally formed cap which includes the cap walls and pipe portions as shown in FIG. 3–5 is preferred.

Figure 4:
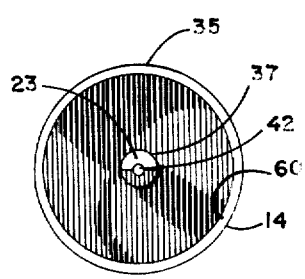
FIG. 4 is a top view of the cap portion.
Figure 5:
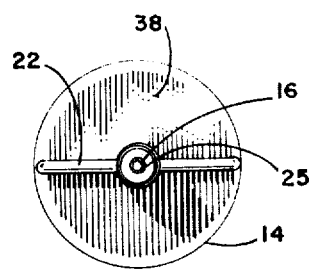
FIG. 5 is a bottom view of the cap portion.

FIGS. 4 and 5 illustrate air dilution cap 14, FIG. 4 showing the cavity defined interiorly of annular side wall 35 with portion 37 of the oxygen supply pipe extending therein from the end wall. FIG. 5 shows the dilution cap from the bottom or outside with the lower or exterior portion 16 of the pipe extending from end wall 38.

It will be noted observing FIGS. 4 and 5 that the diameter of the interior of oxygen supply pipe 16 at the lower end (FIG. 5) may be enlarged as compared to the size of the orifice 42 at the upper pipe end interiorly of the air dilution chamber. The diameter of orifice 42 may be selected to achieve desired oxygen concentrations depending on the flow rates utilized. Thus, the hollow interior 25 of pipe 16 is enlarged as compared to the size of orifice 42 as particularly shown in FIG. 6.

In order to optimize the noise reduction, interior pipe portion 37 extends significantly into the cavity and preferably having a length nearly equal to the edge at which the port terminates in the annular side wall of the dilution cap. Thus, observing particularly FIG. 3, the pipe terminal end 33 is almost directly across from edge 44 of the port.

Figure 6:
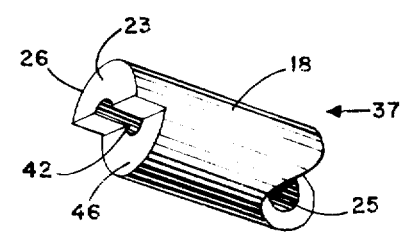
FIG. 6 is an enlarged view of the end of the oxygen supply pipe.

According to the invention and observing FIG. 6, a further and significant noise reduction is obtained by forming a step or notch at the inner terminal end of pipe 18. Thus, noting FIGS. 3, 4 and 6, a notch is formed at interior pipe end 26 which notch preferably forms a substantially flat surfaced step 46 displaced from the pipe end. The distance of the notch displacement from terminal end surface 23 of the pipe at which the notch is placed has been found to be somewhat critical in noise reduction. Accordingly, the distance of the notch step 46 from end surface 23 is such that the oxygen exit orifice 42 is disposed in the cap chamber at least 75% of the length of the port. In other words, observing FIGS. 3 and 5 flattened notch step 46 bisects orifice 42 at a location equal to at least 75% and preferably 80% and more preferably 85% of the distance between lower and upper port edges 45 and 44 in order to achieve desired noise reductions caused by oxygen exiting from orifice 42 within the air dilution cavity 20. As the placement of step 46 and orifice 42 extend further along the cavity and past the position across from port edge 44, much of the control of oxygen dilution is lost. On the other hand where the step and orifice are located further from port edge 44 and closer to the center of the port and cap chamber both oxygen concentration control are reduced and noise is significantly increased proportionately as the displacement increases. It has been found that optimum noise reduction is achieved where the length of interior pipe portion 37 extends about 16.5 millimeters from the interior surface of cap end 38, terminating substantially directly across from port edge 44 and where the notch step is located approximately 0.7 millimeters downwardly from the terminal pipe end. Accordingly, in such an example, orifice 42 communicates within the air dilution chamber approximately 92% of the chamber length, i.e., between interior dilution cap surface 38 and upper port edge 44. Moreover, even additional noise reduction is achieved by having the notch step facing away from the port as shown in FIG. 3.

In order to achieve different oxygen concentrations at selected flow rates one or more openings (not shown) may be provided in cap end plate 38. The number and size of these openings may be selected as desired in order to further give selected oxygen concentrations or dilution factors at suggested flow rates. Such determinations are within the skill of the art, it being understood that normally selected oxygen concentrations are 24%, 28%, 36% and 40% for most patients, with the latter percentage being at 8 liters oxygen flow per minute and the former at 4 liters. As previously explained, oxygen dilutions or concentrations are selected by rotating air dilution cap 14 relative to the cylindrical member 12 so as to close the port of the air dilution cap or to align it to any extent desired with the enlarged notch or notches on the cylindrical member. Preferably, it may be desirable to incorporate two opposed ports on the air dilution cap as shown in FIGS. 1 and 3 and to provide two equal and opposite slots adjacent the end of the cylindrical member as shown in FIG. 2. Thus, with the width of the slot openings being substantially the same as the width of the ports on the air dilution cap, when the port is fully aligned with the slots, the ports will be completely open on each side of the device whereby the maximum amount of air can be entrained into the interior cap chamber for mixing and diluting the oxygen flowing from orifice 42. When greater oxygen concentrations are desired, i.e., the amount of dilution is to be reduced, this is accomplished by simply rotating air dilution cap 14 which will thereby expose a smaller port opening in order to achieve specific desired oxygen dilutions or concentrations. A pair of blades 22 secured to cap end wall 38 and pipe portion 16 will facilitate rotation of the cap by simply grasping the blades with an operator's fingers. A pointer 48 may be provided on the air dilution cap which can be aligned with indicia on the exposed exterior side of the hollow cylindrical member so that adjustment to specific concentrations can be easily accomplished by an operator, observing the indicia and turning the cap to align the pointer 48. Again, as previously noted, with the exterior diameter of the cylindrical member being just slightly less than the interior diameter of the air dilution cap in which it is concentrically received, there will be at least a slight frictional engagement of these two components which will prevent them from slipping apart but at the same time will allow the cap to be rather easily rotated to achieve the different oxygen concentrations by varying the port openings size. Moreover, an interior rim may be placed on the annular cap side wall 35 and a recess formed on the exterior surface of cylindrical member 12 which rim and recess may be engaged so as to further prevent inadvertent slippage of the cap when the device is fully assembled. However, other means of seating the cap onto the cylindrical member may be utilized.

In still another embodiment of the invention the apparatus is designed to allow an operator to select even a greater range of oxygen concentrations. This embodiment incorporates the selective use of one of two air dilution caps, each for different ranges of oxygen concentrations to be delivered to a patient. Thus, one air dilution cap will be used for supplying oxygen concentrations of, for example, between 24 and 30% and the other cap between 35 and 50%. The cylindrical member is designed so that either cap may be secured thereon and removed easily for substitution with the other cap where different concentration ranges are desired. A further embodiment includes cap and cylinder modifications to prevent error in using the wrong cap in the wrong concentration range.

Figure 7:
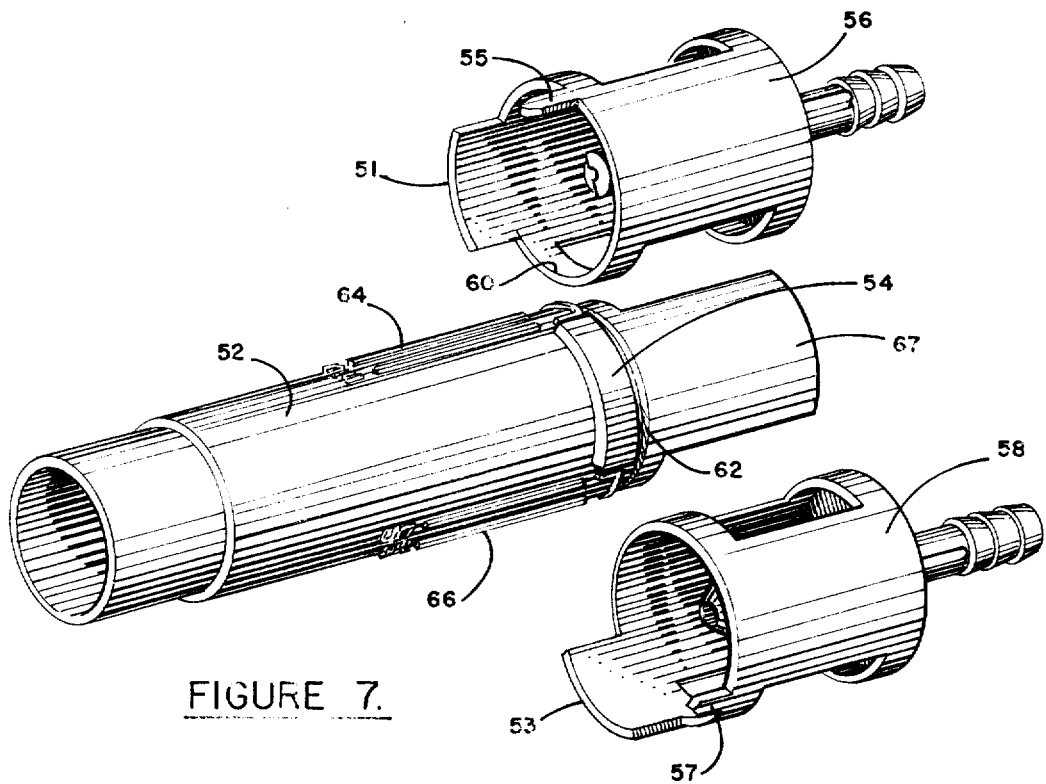
FIG. 7 illustrates another embodiment of the invention for selective use of one of two caps, each for achieving a different oxygen concentration range.

Observing FIG. 7 there is shown hollow cylindrical member 52 which is quite similar to member 12 shown in FIGS. 1 and 2 except that it includes a block member 54 extending around a portion of the outer cylinder wall above and adjacent notch 62. Also shown are two dilution caps 56 and 58. Either or both of the caps may be provided with an oxygen supply pipe having a notched end as discussed previously and shown in FIGS. 3 and 6 although that feature is optional in this embodiment. However, one of the caps will incorporate an oxygen supply pipe having an orifice at its upper end to supply oxygen at lower concentrations, for exmaple, 30% and below at specified flow rates when diluted with air entrained through the dilution cap port while the other cap will supply oxygen at concentrations above 30% at certain flow rates.

The dilution caps 56 and 58 also are provided with a lug (51 and 53 respectively) extending upwardly from the upper cap rim and partially therealong. These lugs are preferably integral with the cap and function to prevent the wrong cap from being placed on the cylindrical member for desired oxygen concentrations. Cylindrical member 52 is provided with indicia 64 on one side showing concentrations for example, between 24 and 30%, i.e., lower concentrations, while indicia markings 66 on the opposite cylinder side show concentrations between 35 and 50% (higher concentrations). Also, each cap is provided with a pointer (55 and 57), pointer 57 on cap 58 being to the left of the lug 53 as the cap is viewed while pointer 55 on cap 56 is to the right of lug 51.

Figure 8:
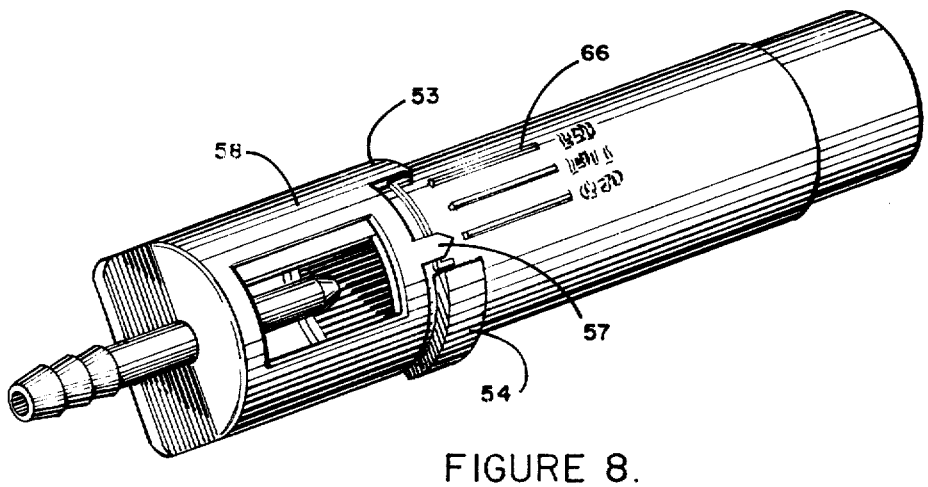
FIG. 8 shows one of the caps of FIG. 7 properly secured.

When securing a dilution cap on the cylindrical member, the open cap end is placed on cylinder end 67 and urged upwardly until interior rim flange 60 extending around the upper cap edges is seated within recess 62 extending around the cylinder. Cap 58 is shown in proper placement on cylindrical member 66 in FIG. 8. Again when so secured, this will prevent the cap from falling off of the cylinder. However, where plastic materials are used and the rim flange is quite small and extends inwardly of the interior cap surface, the cap can be removed by an operator pulling the cylinder and cap apart with relative ease. Observing both FIGS. 7 and 8, it will be noted that because of the lug on one side the cap upper edge and the block member 54, the cap can only be secured when the lug is disposed opposite the block member. Thus, if the cap is erroneously attempted to be placed on the cylinder, block 54 will interfere with the lug as the cap is urged on the cylinder end and prevent seating of the cap thereon. For example, assuming cap 58 is for higher concentrations, the operator will observe that pointer 57 must be adjacent the higher concentration indicia 66 on the cylinder so will place the cap on the cylinder opposite block 54. However, if the operator inadvertently attempted to secure the cap with pointer 57 adjacent the lower concentration indicia 64, interference of block 54 with lug 53 will prevent seating of the cap which would be readily observed. Likewise, lower concentration cap 56 will thus be securable on the cylinder properly only if placed thereon with pointer 51 adjacent indicia 64.

It will be appreciated that the particular shape of block 54 and lugs 51 and 53 are not critical so long as they provide means for preventing the wrong cap being secured on the cylinder for desired oxygen concentrations. Again, where the operator wishes to change from higher concentrations, he need only remove the high concentration cap as described and substitute the low concentration cap in its place. Moreover, different concentrations within the low or high ranges may be achieved by simply turning or rotating the cap as described in the embodiment shown in FIGS. 1 and 8. It will be understood that different means for preventing installation of the wrong cap could be provided. For example, instead of using a block on the cylindrical member for intereference with a lug extending upwardly on the cap as described in FIGS. 7 and 8, an inwardly extending projection or protuberance could be incorporated on the lower interior cap surface and the lower end 32 of the cylindrical member having a slot along one end side for receiving the projection. The projection in the low concentration cap would be opposite the location of the projection in the high concentration cap so would prevent securing the wrong cap for the wrong concentration range in a manner as previously described. In other words, the projection would contact the edge of lower end 32 preventing further installment and seating of the wrong cap or the right cap in the wrong position. Other equivalent means of achieving such a result are intended to be within the purview of the invention.

It will be understood that where the device is produced by forming the cylindrical member as one part and the integral air dilution cap or caps as the other part, including the oxygen supply pipe, the device is easy to assemble and use, requiring little expertise, especially where oxygen concentration indicia are stamped on the exterior of the cylindrical member and incorporating a pointer on the air dilution cap as previously explained. These as well as other advantages and

I claim:

1. An oxygen dilution apparatus comprising:
   a. a hollow cylindrical member open at both ends one end having at least one slot extending along an end portion of said cylinder,
   b. an air dilution cap having an end wall and a cylindrical side wall defining a chamber and having at least one port extending therealong said cap rotatably engaging the slotted end portion of said cylindrical member,
   c. a hollow oxygen supply pipe for directing oxygen into said chamber and extending through said end wall and terminating in a stepped end having a step along one side of said pipe end communicating with the hollow pipe interior, whereby said cap is rotatably adjustable on said cylindrical member to provide selective alignment of said slot with said port for entraining selected amounts of air through said port and slot into said chamber.

2. The apparatus of claim 1 wherein said pipe extends into said cap substantially the length of said port.

3. The apparatus of claim 2 wherein said step bisects said orifice whereby said orifice communicates with said chamber below the end of said pipe within said chamber.

4. The apparatus of claim 3 wherein said step forms a substantially flat surface adjacent the end of said pipe the plane of said surface being substantially normal to the elongated axis of said pipe said surface being disposed along said pipe at least 75% of the length of said port.

5. An oxygen dilution apparatus comprising:
   a. a hollow cylindrical member open at both ends, one end having at least one slot extending along an end portion of said cylinder,
   b. first and second air diluton caps, one for supplying lower oxygen concentrations and the other for higher concentrations each cap having an end wall and a cylindrical side wall defining a chamber and having at least one port extending therealong said cap rotatably engaging the slotted end portion of said cylindrical member and an oxygen supply pipe extending inwardly of said cap chamber and having means exterior of said cap for securing an oxygen supply the thereto, and
   c. means on said cylindrical member for preventing securing the lower or higher concentration air dilution cap on said cylindrical member when the other concentration is desired.

6. Apparatus of claim 5 wherein said caps include a lug member and wherein said means on said cylindrical member comprises a stop member extending outwardly therefrom.

7. Apparatus of claim 6 wherein said cylindrical member includes indicia along one exterior side thereof for lower oxygen concentrations and along the opposite exterior side for higher oxygen concentrations and wherein each said air dilution cap includes an indexing member thereon adjacent said indicia when one of said caps is secured to the cylindrical member with the lug thereon opposite the stop member.

8. The apparatus of claim 1 wherein said pipe end has a restricted orifice.

* * * * *